United States Patent Office 3,834,923
Patented Sept. 10, 1974

3,834,923
TITANIUM DIOXIDE PIGMENTS AND FILLERS
Jonathan Howard Hodgkin, Burwood, Victoria, David Geoffrey Hawthorne, South Oakleigh, Victoria, Jean Drummond Swift, Olinda, Victoria, and David Henry Solomon, Glen Waverley, Victoria, Australia, assignors to Commonwealth Scientific and Industrial Research Organization
No Drawing. Filed Feb. 8, 1972, Ser. No. 224,606
Claims priority, application Australia, Feb. 10, 1971, 3,979/71, 3,981/71, 3,983/71, 3,985/71
Int. Cl. C09c 1/36
U.S. Cl. 106—300                                9 Claims

ABSTRACT OF THE DISCLOSURE

A method of modifying the surface properties of titanium dioxide pigments and fillers by forming on the particles a surface coating of an aluminium compound, the coating having a significant number of acidic sites with pKa values of less than 2.8.

---

This invention relates to a method of modifying the surface properties of particulate mineral materials, specifically titanium dioxide and to particulate titanium dioxide having modified surfaces. In particular the invention is concerned with such materials having "acidic" surfaces (as hereinafter defined) and to methods for their manufacture and modification to produce pigments or fillers having unique and improved properties. More specifically the invention is concerned with methods whereby the organophilic/hydrophilic and reinforcing properties of titanium dioxide pigments or fillers can be modified to suit the medium in which the pigment or filler is to be used.

The prior art refers to the coating of particles of titanium dioxide pigments with substances variously referred to as "aluminum oxide," "silicate," "silica-alumina" and other similar terms, and many such coated pigments are available commercially. Such prior art places emphasis on the desirability of (a) essentially *neutral* surfaces and (b) a minimum level of photochemical activity of the coated pigment. These pigments are also known to be "non-reinforcing" that is, their incorporation in plastics media usually results in compositions of increased hardness and stiffness, but without increased tensile strength or toughness.

It is also well known in the art that modification of a mineral pigment or filler with organic compounds, including amines (a specific example of a base), changes its surface properties but the surface of the gel-coated or natural pigment is hydrophilic and neutral and hence interaction with the organic modifying agent is weak. Only relatively hydrophilic modifying agents can be used. In addition, the original gel-coating influences, usually in an adverse manner, the properties of the final modified material, particularly in exhibiting a tendency to flocculate in non-aqueous systems.

The present invention however has as its main aim the provision of acidic surface coatings on titanium dioxide which may optionally be further modified to provide materials which have unexpectedly useful reinforcing and organophilic properties which will be described hereinafter.

It is also known from the prior art that the surface of certain natural alumina-silicate materials, notably the kaolin group clays, can be modified to give an acidic reaction by means of a procedure involving heat treatment. However, this behaviour is not known for titanium dioxide.

Before defining the present invention it is necessary to define the term "acidity" as used herein. "Acidity" is used in the broad sense to describe the ability of the surface to donate protons to a suitable base (i.e. Bronsted acidity) or to accept an electron, or electrons usually as an electron pair, from a suitable organic base (i.e. Lewis acidity). The acidity can be considered in terms of the number of "acid sites" produced on the surface of the material and their "acid strength." We measure both the number and the strength of the surface acid sites by titration of the surface with butylamine in a non-aqueous solvent using a series of organic indicators, usually referred to as Hammett indicators. These indicators having differing pKa values and consequently enable a distribtuion of sites with various acidities to be obtained. The method used (which is described in the literature) is as follows:

To a sample of the material (4.000 g.) dry benzene (20.0 ml.) is added. This slurry is then slowly titrated with a benzene solution of butylamine (0.02 millimolar) using Hammett indicators as external indicators. Thorough stirring is maintianed during the titration. Samples of commercial products are tested as received. Samples prepared in the laboratory are allowed to stand for at least two weeks before testing, to "condition" and thus be more equivalent to commercial products.

Typical Hammett indicators which can be used for determining the number and strength of acid sites are listed below with their pKa values.

| Indicator | pKa | |
|---|---|---|
| Benzene-azo-naphthylamine | 4.0 | |
| Dimethyl yellow (p-dimethylamino-azo-benzene) | 3.3 | Increasing order of acid strength. |
| p-Amino-azo-benzene | 2.8 | |
| 4 phenyl-azo-diphenylamine | 1.5 | |
| Dicinnamalacetone | −3.0 | |
| Chalcone (benzalacetophenone) | −5.6 | |
| Anthraquinone | 8.2 | |

A considerable number of commercially available titanias have been tested by us to determine the extent of "acid sites" on the surface of these materials.

| Manufacturer | Grade | Manufacturer | Grade |
|---|---|---|---|
| ATP | R-SM, R-SM2, R-CR, R-CR2, R-CR3, R-CR6, R-CR10, R-CR21, R-HD, R-PP5, R-XL, A-E, A-LF, A-PP2 | Dupont | R-500, R-900, R-901, R-902, R-960 |
| | | Ishihara | R-780, R-820, R-830 |
| | | Laporte (Aust.) | A-G, A-RG, A-RH20, A-RH200 |
| BTP | R-HD2, R-TC2, R-TC5, R-TC6, R-SM3, R-FC | Laporte (U.K.) | Tiona WDB, RG2, RP, RE-30, RH-42, RO-60, RO-676 |
| TCL | R-HD6, R-CR7 | National Lead | Titanox CL, Titanox CLNC, Titanox RA-67, Titanox RA-51, Titanox RA-47, Titanox RA-44 |
| American Potash. | Tronox CR-800, Tronox CR-801 | | |
| Bayer | R-FD1, R-FD2, R-KB1, R-KB2, R-KB3, R-UF | New Jersey Zinc | R-760, R-770 |
| | | Thann et Mulhouse. | RL-17 |
| | | Titangesell-schaft. | Kronos R, Kronos RN-45, Kronos RN-57, Kronos RN-58, Kronos RN-59, Kronos RN-61 |

In all cases, the "acidity" found using the titration method described above, titrating with butylamine in benzene to a pKa value of 2.8 was nil. In other words, these materials have no sites with an "acidity" of less than 2.8.

We have now found that titanium dioxide particles can be provided with surface coatings having significant numbers of acid sites with pKa values measured as described above of less than 2.8. Such materials have unexpectedly useful and desirable properties.

In accordance with one aspect of this invention, therefore, we provide a pigment or filler material consisting of particulate titanium dioxide having a surface coating comprising an aluminium compound and having a significant number of acidic sites with a pKa value of less than 2.8.

"Significant" in this context means that the presence of the sites can be detected and their strength measured by the methods described herein.

The titanium oxide may be in the form of either rutile or anatase and optionally may have a pre-coating applied to it.

The aluminium compound is preferably an aluminosilicate material, most preferably formed by the methods hereinafter described. As indicated above coatings of alumino-silicate materials are known *per se* but not with acidities of the defined level.

In accordance with another aspect the invention provides a method for producing an acidic surface coating on a particulate titanium dioxide pigment or filler material which comprises the steps of:

(a) forming a coating of an aluminium compound on the surface of the particles;
(b) forming the coated particles into a slurry in an aqueous medium at pH of less than 5.0;
(c) recovering the particles from the slurry; and
(d) heating the particles;

thereby to produce particles having a significant number of acidic sites in the surface thereof with a pKa value of less than 2.8.

The titanium dioxide may be in the form of either rutile or anatase.

In accordance with a further aspect of the present invention a particulate titanium dioxide pigment or filler having a surface coating with a significant number of acidic sites with a pKa of 2.8 or less (measured as described hereinafter) is treated with an organic base (as hereinafter defined). The acidic titanium dioxide materials of the present invention are preferred but titanium dioxide of like acidity from any other source may also be used.

The organic bases which can be used are not restricted to any specific class but rather can be chosen from the general classes of organic compounds with basic properties. Accordingly, the term "organic base" is used herein in the broad sense to include materials which bond by salt formation, i.e. by accepting a proton from the surface, and materials which donate electrons, or electron pairs, to the surface. The latter are often referred to as Lewis bases.

Thus the organic bases may be selected from the classes comprising amines, alcohols, esters, ketones, ethers and other classes of compounds which contain oxygen or nitrogen which will act as proton acceptors or electron donors. The classes of compound may be selected from the aromatic or aliphatic series, with straight or branched chain and the compounds may be substituted with other groups such as halogen or nitro, provided the compound retains its basic properties. Amines and alcohols are particularly suited to producing desirable modifications to mineral surfaces by this process.

A wide range of amines and alcohols is suitable for use in this process, including primary, secondary and tertiary amines or alcohols. In specific cases, polymeric compounds with suitable functional groups may be used to modify the acidic surface, for example "Versamids" or polyamines with terminal amino groups give useful products. Amines of naturally occurring materials, such as tallow amines, are also useful. Unsaturated amines or alcohols are particularly useful as they can facilitate bonding of the pigment or filler to polymeric matrices by free radical or other reactions during subsequent compounding, curing or drying.

The products obtained from the process just described also form a part of this invention. They are ideally suited as pigments and fillers for use in organic polymer compositions, including polyesters, polyurethanes, rubbers, polyvinyl chloride and polyethylene type compositions. Such compositions containing the above products are also a part of this invention.

The modified materials of this invention, when used in such polymer compositions, exhibit the following improved properties:

The materials disperse more quickly and better in non-aqueous systems.

When dispersed in aqueous and non-aqueous systems or solutions of organic polymers, the viscosity is significantly lower than with commercial materials. This effect is often readily changed by suitable selection of the base. Thus, one base may lower the viscosity of the material in a polyester system but not in rubber, and another may produce the opposite effect.

A high bulking factor is often shown by the treated materials, which is an indication of the extremely good dispersion obtained by this process.

The treatment makes the surface more organophilic and hence more hydrophobic. Thus the wetting properties of the material in aqueous and non-aqueous systems can be modified to a desired level.

The materials resist the absorption of moisture from the air.

According to a still further aspect of the present invention a particulate titanium dioxide pigment or filler having an acidic coating (as hereinbefore described) is provided with an organic polymeric coating produced by treating the pigment or filler with a polymerisable monomer or mixture of monomers under conditions such that polymerisation of the monomer or mixture of monomers is catalysed by the pigment or filler surface and a tightly bound polymer coating is formed on the surface, which coating contains or can be treated to yield reactive groups capable of initiating grafting reactions between the coating around the pigment or filler surface and a matrix polymer in which the pigment or filler is dispersed.

The monomers which can be used are those which are susceptible to cationic polymerization, which the "acidic" surfaces of the pigment or filler will promote.

The reactive groups are preferably but not essentially also capable of crosslinking coating polymer and the matrix polymer in the vicinity of the pigment or filler particle surface. For example, the coating polymer may contain groups which can be oxidised or otherwise converted to yield peroxidic or other radical-generating species which are capable of initiating the necessary grafting reactions. Typically such monomers include styrene and substituted styrenes, including styrenes substituted with p-methoxy or p-methyl groups; aliphatic and aromatic olefins with more than one double bond; vinyl ethers, including methyl, butyl and 2-ethylhexyl vinyl ethers; chloro substituted vinyl ethers; N-vinyl carbazole, divinylbenzene, vinyl ketones; vinyl ethers with general substituted groups, including linoleyl, allyl; indenes, coumarones; vinyl phenyl siloxanes; α-methyl styrene and its derivatives.

Polymers formed from such monomers can be reacted, if necessary in the presence of catalysts or actinic light, with oxygen, ozone or other oxidizing species capable of converting the reactive groups contained in the polymers, to peroxides, hydroperoxides, ozonides, or other species which can act as radical generators.

The amount of coating material applied to the particulate mineral may vary in amount from about 0.5% to 100%, preferably 1% to 25% by weight of filler or pigment.

The steps of the process defined above will now be considered separately in detail.

(a) Coating of titanium dioxide particles

The formation of aluminium compounds as surface coatings of this general type is well known in the art. The exact nature of the coatings is not known, particularly after the coating material has been dried. Such coatings are referred to loosely in the literature as "aluminium oxide," "silicate," "$Al_2O_3/SiO_2$" and similar terms. These are very often in hydrated form. Many commercially available materials are already coated in such a way and can be used for the following steps of the method of of this invention without further treatment.

The order and manner in which the aluminium (and silicon) compounds are deposited are not critical, although certain procedures work better with some pigments. Similarly it is sometimes necessary or desirable to subject the coated pigment or filler to a treatment, such as a heat treatment, prior to pH adjustment and heating. The coating step may thus be carried out by slurrying the titania in water and adding a solution of the coating materials, for example, by adding the solution of a soluble aluminium salt such as aluminium sulphate. If an aluminium silicate type of coating is being prepared, then this may be done in any convenient way. A solution of an aluminium salt, such as aluminium sulphate or sodium aluminate, may be added first and then a silicate solution added thereafter. Alternatively the order can be reversed, or the two solutions added together or in small increments alternately. If desired, the salt or salts may be added in solid form. Since the coating is not meant to correspond exactly to aluminium silicate, the molar ratio of silicon compound to aluminium compound can vary from 0:1 up to 5:1. Although in general the higher the amount of aluminium compound the greater the total audity.

Some attention to the concentration of the added salts is required to ensure that a satisfactory gel coat is obtained—such precautions are known art.

The titania used as starting material will normally be a finely divided, particulate material. It can be any of the commercially available materials, either already coated or without coating. The "acidity" produced in these materials may vary according to the nature of the starting material its pretreatment (if any), and particularly its crystal shape and particle size. The smaller the particle size the greater the number of acid sites that will be produced by the process, because of the larger surface area exposed to the process.

Normally the coated titania is filtered off and washed with water before proceeding to the next step of the process. However, in some cases an adjustment to the pH can be made direct to the slurry during and/or at the conclusion of the coating procedure. It is also sometimes advantageous to calcine the coated material before proceeding to the second step of the process.

(b) pH adjustment

The concentration of the slurry is not critical but in practice is limited by difficulties in stirring, if it is too concentrated, and cost, if it is too dilute. If desired, the acid solution may be prepared first to a pH of less than 5 and the solid added to it, with further adjustments to the pH if necessary.

The pH to which the slurry must be adjusted will vary according to the type of titanium dioxide and the "acidity" desired in the material. The optimum pH is between 5 and 3 although low pH values can be used if the treatment time is short.

The adjustment to pH may be brought about by the addition of any water soluble acidic material. Thus an acid or an acidic salt or oxide may be employed for this purpose. The acid used can be organic or inorganic. Mixtures of acids, either inorganic or organic or both, are included. Typically, sulphuric acid, hydrochloric acid, phosphoric acid, acetic acid, formic acid and other aliphatic carboxylic acids, benzoic acid and other organic aromatic acids, may be employed. Acid salts such as sodium hydrogen sulphate or aluminium potassium sulphate, or acidic oxides, such as sulphur trioxide may be used.

(c) Heat treatment

After recovery of the coated particles, for example by dewatering and drying, the final heating can be carried out in any suitable equipment between the temperatures of about 100° and 800° C. The best results are usually obtained by heating in the range of 120°–300° C. In applications where more highly acidic sites are required higher temperatures can be an advantage. The product should be heated for sufficient time to produce the acidity desired on the surface. The time required will depend on the equipment used, but must be sufficient to remove free water adhering to the material and then to convert the coating to produce the desired acidic sites. It may be extended for longer periods without adversely affecting the properties of the product.

The final product may require size selection where a small amount of agglomeration results from the heat treatment.

The above-described operations result in materials with significant numbers of sites with "acidities" less than 2.8 and hence improved properties. As will be seen from the following examples, significant acidity is produced in all cases when treated according to this invention. Furthermore, by testing each material with progressively more "acid" Hammett indicators, the "acid" strength of the sites can be estimated. It is found that some sites with acid strengths in the pKa −3.0 to −5.6 range are present in most cases but the majority are in the range +1.5 to −3.0. The commercial materials tested, as mentioned above, have no sites less than 2.8, and only four commercial materials tested have sites in the 4.0 to 2.8 range; the very large majority have no sites more acid than pKa 4.0.

The acidic titanias are useful in all of the areas of application in which the materials, without the treatment of this invention, are used. Thus they are useful as pigments or fillers in aqueous and non-aqueous media. They are of particular use in paper coatings, paints, plastics, elastomers and various specialized applications such as pressure sensitive copy paper where the acidity can be used to cause colour reactions. They are also of interest when further modified, as described below by reaction with basic materials or by grafting polymers onto their surfaces.

(d) Treatment with organic base

In general, the method of this invention involves the bringing together in any suitable manner of the prepared "acidic" titanium dioxide and the organic base.

Thus the two components can be physically blended or mixed in any suitable equipment without the addition or use of any other component. The choice of equipment will vary according to the process conditions and product requirements, e.g. whether the base component is liquid or solid, the amount of base to be added, and so on. Typically one can use a rotary blender, centrifugal mixer, ribbon blender, vertical mixer, ball mill or a rod mill. A particularly useful technique involves the use of a fluidized bed mixer in which the base is added to the fluidized mineral. If desired, additional components can be mixed or blended with the product before, during or after the incorporation of the organic base.

A very convenient method for achieving uniform reaction of the organic base consists in the use of a suitable non-aqueous solvent in which the mineral component can be slurried. The organic base component can be added to the slurry either incrementally or continuously, alone or dissolved in the same or different solvent. Alternatively, the organic base may be dissolved in the solvent and the mineral then added to form a slurry. Typical solvents which are suitable are benzene and similar aromatic hydrocarbons, liquid paraffin hydrocarbons such as hexane, heptane and higher homologues, petroleum fractions, kerosene, halogenated solvents such as trichlorethylene, carbon tetrachloride, ethers and esters. In selecting the solvent, a prime consideration is that the interaction between the solvent and the pigment or filler surface must be less than between the organic base and the pigment or filler surface. In other words, the solvent should be less basic than the modifying agent.

Water, attracted to the "acidic" sites of the titanium dioxide, may interfere with the interaction with a base. It is therefore often desirable to dry the material before use, say at 110° C., in order to reduce the amount of water bonded to the surface.

In general, amounts of organic base up to about 5% can be used, but the optimum concentration of base cannot be determined by any general rule. With polymeric bases, greater amounts of the base can generally be used. The surface area and particle size of the mineral will affect the amount of organic base to be used. In general terms, the larger the surface area and the smaller the particle size, the greater the amount of base required to achieve the desirable treatment.

(e) Production of polymeric coating

Preferably the polymerisation is carried out by contacting the monomer with the "acidic" pigment or filler in such a way that the particles are each coated with polymer but remain separate. For example, the pigment or filler can be fluidized and the monomer introduced into the fluidized system as a vapour at a suitable temperature. Alternatively, the monomer may be added to the fluidized bed as a solution in a volatile solvent which evaporates from the bed.

It is also possible to disperse the mineral in a solvent which does not interfere with the catalytic properties of the surface of the mineral and in which the monomer is dissolved or to which the monomer is added, continuously or incrementally. Typical solvents are benzene and similar aromatic hydrocarbons, liquid paraffin hydrocarbons such as hexane, heptane and higher homologues, petroleum fractions and kerosene. Adequate stirring, agitation or mixing is required to maintain the mineral as a dispersion of separate particles on which the polymerization will take place. In some cases, small amounts of dispersing agents which do not interfere with the polymerization may be added.

Formation of radical inducing species in the coating polymers may be carried out using the methods described hereinafter. Thus this step can be achieved by passing air, oxygen or ozonised air or oxygen through the dry, coated filler or pigment at or near room temperature. Thorough mixing can be ensured by the use of a fluid bed or tumbling mixer and the extent of peroxide formation can be determined by iodometric titration. It is often desirable to expose the coated materials to the vapour of polar compounds such as water, alcohols or esters prior to oxidation in order to increase the storage life of the oxidized product, which may be adversely affected by the strongly acidic surface.

Controlled amounts of crosslinking of the polymer coating can be introduced where necessary, in order to prevent desorption of the coating. This can be achieved in two ways:

(a) by the use of divinyl monomers mixed with another monomer, e.g. divinyl benzene/styrene, or (b) by the decomposition of some of the peroxidic groups produced on the surface.

The cross-linking process may occur during the incorporation of the coated pigment or filler into a plastics composition.

Plastics and elastomeric compositions containing the coated fillers or pigment can be prepared by mixing the matrix polymer and coated pigment or filler using conventional hot processing equipment well known in the plastics art. It is preferable, although not essential that the finely divided ingredients by dry blended and then mixed in a Banbury or Brabender "Plastograph" mixer. The ratio of coated filler to matrix polymer is a matter of choice and the proportion of coated material may comprise from 1 to 100% of the composition. Other ingredients such as plastics, dyes, additional cross-linking agents, etc., may be incorporated in the composition. The compounding conditions are dependent on the nature of the coating material and the matrix polymer, although in the absence of added accelerators a typical peroxidised coating would require compounding at 100 to 200° C. for 5–30 minutes duration for completion of the coating-matrix polymer reaction. Alternatively the ingredients may be compounded under such conditions that some of the radical-generating species remain intact and the radical induced reactions completed in a subsequent curing process.

The organic material coating the filler or pigment particles preferably comprises one or more groups which can be oxidized or otherwise converted to yield peroxidic or other radical-generating species which are capable of initiating the necessary grafting reactions. These groups can readily be incorporated into the coating material by appropriate choice of monomers used to prepare the coating. Such reactive groups include: allylic, aldehydic, benzylic, secondary or tertiary hydrogen atoms, or aromatic, ethylenic or acetylenic unsaturation, or other groups capable of reaction, if necessary in the presence of catalysts or actinic light, with oxygen, ozone or other oxidising species capable of converting these reactive groups to peroxides, hydroperoxides, ozonides, or other species which can act as radical generators. Alternatively, the coating material may contain functional groups which can form adducts with peroxides, hydroperoxides or substituted peroxide derivatives or other species, capable of acting as radical generators.

As a further alternative, the coating material may contain as reactive groups species which can initiate grafting and/or crosslinking reactions between the coating and matrix polymers or other ingredients of the plastics or elastomer composition by other than radical-induced processes or the coating may contain groups capable of conversion to such reactive species.

In addition to the radical generators or their precursors, the coating material may contain reactive groups including vinylic or substituted vinylic groups, capable of undergoing crosslinking reactions either during the coating process, during subsequent treatment of the coated pigment or filler, or during the compounding or curing of materials incorporating the coated pigment or filler.

The coating material may also contain functional groups specifically incorporated to promote adhesion of the coating to the pigment or filler surface by the formation of strong chemical or physical bonds.

The coating materials include, but are not necessarily confined to auto-oxidisable drying oils, including wood, linseed, safflower and soya oils and other unsaturated species including cyclopentadiene and dicyclopentadiene, butadiene, terpenes, and their derivatives which may form polymeric peroxides on exposure to atmospheric oxygen, as well as alkyd or other resins of natural or synthetic origin which may contain these or similar auto-oxidisable species; vinyl aromatic polymers and copolymers, including those of styrene, methoxy styrene, vinyl toluene, ethyl vinyl benzene and divinyl benzene; alkene, alkadiene polymers and copolymers which contain residual unsaturation or oxidisable centres; polyesters, polyethers, acrylic, substituted acrylic and other vinylic or condensation polymers which contain residual unsaturation or oxidisable centres, or which contain, as substituent groups, allylic, substituted allylic, vinylic or polyunsaturated species capable of forming radical generating species by reaction with oxygen, ozone or other oxidizing species.

Alternatively, a polymeric precursor including the varieties described may contain as substituents carboxy, hydroxy, isocyanate, acyl or aroyl halides, or other groups or their derivatives, which can be condensed with hydroperoxides, substituted peroxides or substituted azo derivatives or other initiators to yield a polymeric adduct capable of acting as a radical generator. Although in most cases the presence of polar groups in the coating material will adequately bond the coating polymer to the pigment or filler surface by strong physical forces, improved chemical bonding can be achieved by incorporation in the coating material of reactive substituents, including hydroxy, amino, isocyanate, carboxylic or sulphonic acids or their derivatives or alkoxysilyl groups, either by copolymerisation of a suitable monomer, such as acrylic acid or methacrylic, cyanoethyl or sulphoethyl acrylate or methacrylate, substituted styrene, triethoxyvinylsilane, tetraethylsilicate, or trimethoxysilylpropyl methacrylate, during formation of the coating polymer, or by subsequent reaction.

The invention also includes the methods of preparing pigments, fillers and like particulate materials described herein, and coatings and plastics materials containing the pigments or fillers of the invention.

In order to illustrate the invention more fully, the following examples, which should not be construed as limiting the scope of the invention, are described. All parts and percentages are by weight unless otherwise mentioned.

ACIDIC COATINGS

Example 1

Aluminium sulphate dissolved in water (50 ml., 10%) was added to a sample of titanium dioxide (50 g.) dispersed in water (150 ml.). The slurry was stirred for 1 hour and then ammonium hydroxide added slowly to bring the pH to 7. The slurry was filtered, and the treated titanium dioxide washed twice with water and then dried overnight at 120° C. This $TiO_2$ was then treated as follows:

(a) Slurried with dilute sulphuric acid to give a pH of the slurry of 2.5. The slurry was stirred for 10 mins., filtered and the titanium dioxide washed twice with water and then dried overnight at 120° C.
(b) The dried material was then calcined at 450° C. for 2 hours.
(c) The material was treated with dilute sulphuric acid solution to give a slurry of pH 3.5. The slurry was stirred for 1 hour, filtered and the $TiO_2$ washed twice with water and dried at 120° C. overnight.

Example 2

A sample of titanium dioxide (50 g.) was dispersed in water (100 ml.) and then a solution of sodium aluminate (3.2 g. in 50 ml. water) was added with stirring. After stirring for 10 minutes a solution of sodium silicate (5.6 g. in 50 ml. water) was added and stirring continued for a further 10 minutes. The pH of the slurry was then adjusted to pH 7 with 2 N sulphuric acid and allowed to stand overnight. The slurry was filtered and the coated titanium dioxide washed twice with water and dried at 120° C. This coated material was then treated in the following ways:

(a) Slurried with dilute sulphuric acid to give a slurry of pH 3.5 to 4.0. After stirring for 1 hour, the slurry was filtered and the $TiO_2$ washed twice with water and then dried. The dried material was then calcined at 450° C. for 2 hours.
(b) Heated at 450° C. for 2 hours then treated as in (a).
(c) Treated as in (a) but with aluminium potassium sulphate (5% solution) instead of 1N $H_2SO_4$.
(d) Treated as in (a) but with acetic acid solution (20%) instead of dilute sulphuric acid.
(e) Treated as in (a) but final calcining was in 300° C.
(f) Treated as in (a) but final calcining was at 650° C.

Example 3

Coated titanium dioxide samples were prepared in the same manner as in Example 2 but the pH was adjusted to pH 7 with 2 N sulphuric acid after the addition of the sodium aluminate and before the addition of the sodium silicate.

Example 4

(a) A commercially coated titania with about 4.1% aluminium as $Al_2O_3$ and 8.5% silica as $SiO_2$ was treated as in Example 2(a).
(b) A commercially coated titania with about 2.0% aluminium as $Al_2O_3$ and 0.7% silica as $SiO_2$ was treated as in Example 2(a).

The materials obtained from Examples 1–4 were tested according to the method described earlier, to determine the acid sites produced. The following results were obtained.

| Example number: | Total acidity (millimoles amine/g. pigment ×10³ to pKa value of 2.8) | Acidity to pKa value of 1.5 |
|---|---|---|
| 1a | 18 | 14 |
| 1b | 20 | 15 |
| 1c | 16 | 14 |
| 2a | 15 | 12 |
| 2b | 15 | 12 |
| 2c | 12 | 10 |
| 2d | 12 | 10 |
| 2e | 13 | 10 |
| 2f | 12 | 10 |
| 3a | 14 | 12 |
| 3b | 14 | 12 |
| 3c | 13 | 10 |
| 3d | 13 | 10 |
| 4a | 15 | 12 |
| 4b | 10 | 8 |

REACTION WITH BASES

Example 5

The product obtained in Example 2(a), was placed in a high-speed mixer (Sorvall Omnimixer). Tallowamine (0.5% by weight on the titanium dioxide) was added and the mixer run on speed 4 for 2 minutes. A further 0.5% by weight of tallowamine was then added and the mixer run at speed 4 for 2 minutes and then speed 2 for 2 minutes.

In separate experiments, the "acidic" titanium dioxide was treated similarly with octylamine (0.5% by weight on the titanium dioxide) and with hexanol (0.4% by weight).

The materials produced were tested to determine their improvement in viscosity as suspensions, by measuring the viscosity of a 20% w./w. slurry of each of the materials in Ondina oil 33 using a Brookfield LVT Viscometer.

For comparison, a commercially available silica-alumina coated titania was treated as described in this example, with tallowamine, octylamine and hexanol. The same commerical material was also first heated at 110° C. for 4 hours and then treated with the three bases.

The viscosities (in poise) obtained are shown below:

|  | Tallowamine | Octylamine | Hexanol |
|---|---|---|---|
| "Acidic" TiO$_2$ | 7.6 | 8.8 | 14.1 |
| Commercial TiO$_2$ | 23 | 22 | 20 |
| Commercial TiO$_2$/110° C | 16.4 | 24.4 | 25 |

POLYMER COATING AND ITS OXIDATION

Example 6

A sample of acidic titania (prepared as in Example 1(a)) was slurried with dry hexane containing 1% of styrene monomer. The slurry was stirred for 30 minutes and the titania was filtered off and dried. The dry titania was then tumbled while a stream of 1% ozone in air was passed at 3 l./min. This treatment was carried out for 0.3 hours and the number of peroxy groups measured by iodometric titration was found to be 0.03 mmole/g.

The material obtained was compounded in a Brabender Plastograph using a ratio of 10 to 40 of titania to "beaded" polyethylene at a melt temperature of 137° C. The material showed improved toughness compared to an equivalent material in which the acidic titania had not been treated as described above.

Example 7

An "acidic" titania (prepared as in Example 2(a)) was fluidized in a bed, with dry air. Into the stream was introduced a 1:1 by weight mixture of divinyl benzene and styrene monomers, so that 2% by weight (based on the titania) was passed through the system every 20 minutes. The flow of monomers was stopped after 1 hour and 1% ozonized air was introduced for 20 minutes. The titania was removed and the peroxide content was found to be 0.03 mmoles/gm. by iodometric titration. A sample compounded in the Brabender Plastograph showed better toughness properties than when an untreated titania was used.

Example 8

A sample of "acidic" titania (100 g., prepared as in Example 4(a)) was stirred in a tumble mixer under an atmosphere of nitrogen. Nitrogen saturated with isoprene vapour at 30° C. was introduced into the mixer atmosphere. The mixing was continued for 1 hour, the isoprene being replenished as it was used. Four drops (0.2 g.) of dimethylaminoethylmethacrylate was then added and the mixture stirred for a further ½ hour. The thus treated titania was tumbled in a stream of air for two weeks at 30° C. and the peroxide content analysed at daily intervals. The peroxide content rose to 0.1 mmoles/gm. within 3 days and remained at this value for the rest of the time. Carbon analysis of this material indicated a coating value of about 4.7% polyisoprene. (At 50° C. the peroxide content rose to the same maximum in eight hours.)

Example 9

The materials produced in the foregoing examples were tested to determine the improvement in viscosity of their suspensions, by measuring the viscosity of a 30% w./w. slurry of the material in "Ondina oil 33" using a "Haake Rotavisco" viscometer at a series of shear rates. The resulting flow curves were fitted to Casson's equation and the yield stress and viscosity at infinite shear rate were calculated. These results were compared with those obtained from commercially available coated and uncoated titanias which were not treated in accordance with the invention. Both undried materials and materials dried at 120° C. for 12 hours were used. The yield stresses (in dyne.cm.$^{-2}$) and viscosity at infinite shear $\eta_\infty$ (in poise) are shown below:

|  | Yield stress | $\eta_\infty$ |
|---|---|---|
| Commercial, uncoated TiO$_2$: |  |  |
| Undried | >1,500 |  |
| Dried | 350 | 1.60 |
| Commercial, aluminium silicate coated TiO$_2$ Example 4: |  |  |
| Undried | 1,420 | 2.72 |
| Dried | 806 | 2.25 |
| Example 4(a), "Acidic" TiO$_2$: |  |  |
| Undried | 565 | 2.40 |
| Dried | 221 | 2.51 |
| 0.5% w./w. heptanol added to pigment dispersion (undried) | 435 | 2.40 |
| 0.5% w./w. heptanol added to pigment (in (omnimix) before dispersion (undried) | 63.5 | 2.52 |
| 0.5% w./w. decylamine added to pigment (in omnimix) before dispersion (undried) | 57.8 | 2.54 |
| Commercial, aluminium silicate coated TiO$_2$, 0.5% w./w. heptanol added to pigment (in omnimix) before dispersion (undried) | 225 | 2.25 |
| Example 8 "Acidic" isoprene coated TiO$_2$ | 6.92 | 2.25 |

Example 10

Similar viscosity measurements of 30% w./w. slurries of these pigments were obtained in linseed oil and are shown in the following table.

|  | Yield stress | $\eta_\infty$ |
|---|---|---|
| Commercial, uncoated TiO$_2$ (undried) | 40 dyne.cm.$^{-2}$ | 0.6 poise |
| Commercial, aluminium silicate TiO$_2$ (Example 4 undried) | 320 dyne.cm.$^{-2}$ | 0.56. |
| Example 4(a) "Acidic" TiO$_2$: |  |  |
| Undried | 44 dyne.cm.$^{-2}$ | 0.56. |
| Dried | <1.0 | ≈0.6. |
| 0.5% w./w. heptanol added to pigment dispersion (undried). | 18.5 | 0.61. |
| Example 8 "Acidic" isoprene coated TiO$_2$ (undried). | 1.17 | 0.67. |

Example 11

Some of the materials tested in previous examples were also compared to determine differences in the uptake of moisture on to the surface. This was measured by the average weight gain of four, 1 g. samples when exposed to a relative humidity of 60% for 2 hours.

The results obtained were:

|  | Percent gain in weight |
|---|---|
| "Acidic" titanium dioxide (Example 8) isoprene coated | 0.27 |
| Commercial TiO$_2$, aluminium silicate coated | 1.72 |
| "Acidic" titanium dioxide/1% tallowamine | 0.65 |
| "Acidic" titanium dioxide/0.5% octylamine | 0.82 |
| Commercial TiO$_2$, 110° C./1% tallowamine | 0.93 |
| Commercial TiO$_2$, 110° C./0.5% octylamine | 1.3 |

It will be appreciated that modifications, other than those included above can be made to the methods and products of the invention. For example it is possible to incorporate into coatings or plastics materials other particulate mineral materials such as kaolin, vermiculite, talc and the like, to extend the pigment properties of the titanium dioxide using a cheaper material. Such "extenders" are well known in the art. Particularly useful materials suitable as extenders with the pigments of this invention are those described in our copending Australian patent application Nos. PA 3,980/71, PA 3,982/71, PA 3,984/71 and PA 3,986/71, all filed Feb. 10, 1971. These materials are prepared in a manner similar to the pigments of this invention.

The present invention includes extended pigments of the above type and coatings and plastics materials containing them and all other modifications which fall within its spirit and scope.

What we claim is:

1. A pigment or filler material comprising dry titanium dioxide particles coated with a compound of aluminum and having upon the surface a significant number of acidic sites with a pKa value of less than 2.8 as measured by titrating said aluminum compound coated titanium dioxide particles with butylamine in an organic solvent using a Hammett indicator.

2. The pigment or filler material of Claim 1 wherein in addition to said compound of aluminum said particles are also coated with a compound of silicon.

3. The pigment or filler material of Claim 2 wherein said particles are coated with an alumino-silicate.

4. A process for the production of dry pigmentary titanium dioxide particles comprising:
(a) forming an aqueous slurry of titanium dioxide particles coated with a compound of aluminum, said aqueous slurry having a pH less than 5;
(b) recovering said particles from the slurry at a pH less than 5; and
(c) heating the recovered particles for sufficient time to produce the desired acidity on the surface.

5. The method of Claim 4 wherein said heating is at a temperature of from about 100° C. to 800° C.

6. The method of Claim 5 wherein said heating is at a temperature of 120° C. to 400° C.

7. The method of Claim 4 wherein said heating is continued for a sufficient time to form on the surface of said recovered particles acidic sites having a pKa value of less than 2.8.

8. The method of Claim 4 wherein the aluminum compound coated titanium dioxide particles are also coated with a compound of silicon.

9. The method of Claim 8 wherein said aluminum compound coated titanium dioxide particles are coated with an aluminum silicate produced by treating the particles with a solution of an aluminum salt and a silicate solution.

References Cited

UNITED STATES PATENTS

| | | | |
|---|---|---|---|
| 3,522,078 | 7/1970 | May et al. | 106—300 |
| 3,224,993 | 12/1965 | Wynne | 106—300 |
| 3,004,858 | 10/1961 | Sheehan et al. | 106—300 |
| 3,015,573 | 1/1962 | Myers et al. | 106—308 N |
| 3,567,478 | 3/1971 | Dietz et al. | 106—308 B |
| 3,658,566 | 4/1972 | Sheehan et al. | 106—300 |
| 3,146,119 | 8/1964 | Ritter | 106—300 |
| 3,542,575 | 11/1970 | Nelson | 106—300 |
| 3,180,754 | 4/1965 | Acker et al. | 106—300 Q |
| 3,437,502 | 4/1969 | Werner | 106—300 |

DELBERT E. GANTZ, Primary Examiner

J. W. HELLWEGE, Assistant Examiner